Patented Mar. 7, 1944

2,343,258

UNITED STATES PATENT OFFICE 2,343,258

METHOD OF OBTAINING HIGH LUSTER UPON AND PRESERVATION OF FRUITS AND VEGETABLES

James F. Hussey, Cynwyd, Pa., assignor to Brunhilde Weller Skinner, Dunedin, Fla.

No Drawing. Application August 3, 1940, Serial No. 351,272

17 Claims. (Cl. 99—168)

This invention relates to the art of imparting a relatively stable luster to the outer rind or peel of fruits or vegetables.

It has long been known to the art that shrinkage or dehydration of fruits or vegetables may be retarded by the use of paraffin wax or like substances. Such preservation over a relatively long period of time has resulted from the careful application of a thin film of paraffin over the skin or rind of the fruit or vegetable. One method employed by the industry in applying this wax film has comprised melting the material and atomizing it in a heated chamber, through which the fruit or vegetables are being passed, and has found wide use in the preparation of such perishables for market. Considerable advantage is enjoyed in the handling of such produce, thus treated, over untreated produce of the same class. Also frequent expensive icing and refrigeration can be reduced or eliminated, whereby the treated product is able better to retain its natural flavor and goodness.

However, it was soon found by the industry that relatively soft waxes, paraffin wax, as one example, while giving good shrinkage control, imparted little or no luster. It is well known that hard waxes, when used and when vigorously polished or buffed, give good luster but poor shrinkage control and that, under competitive conditions, an attractively bright product brings the producer a premium over a dull, lifeless looking product of the same class. Therefore, the industry resorted to adding certain harder or more brittle waxes to the paraffin so as to obtain a coating which could be polished or buffed with brushes to produce a fairly high luster. Obviously, the more hard wax added to the soft wax, the higher the very desired luster attained; but, it was further found that the harder the wax coating became as a result of competition for luster, the more the very desirable shrinkage control qualities disappeared. Thus the industry of processing, which includes the preparation of fruits and vegetables for marketing, has for the past fifteen years been choosing between good shrinkage control or a high luster on the fruits and vegetables and has been unable to attain both at the same time.

I have discovered that a wax may be prepared possessing the inherent factors for imparting to fruits and vegetables a most desirable luster while at the same time retaining all the other desired qualities of preservation and shrinkage control. My discovery makes use of the light reflecting qualities of certain crystalline materials intimately dispersed in the medium or carrier, which latter is used to attain shrinkage control. These virtually small mirrors serve to reflect light, when the medium is applied in a relatively thin film on the surface to be protected and improved. I have discovered that the high luster factors serve to greatly reduce the injurious brushing heretofore needed to bring out a lustrous and attractive polished finish to fruits and vegetables. When the coating material of this invention, containing the finely dispersed crystals or solid particles, is applied, in a molten state by brushing within a heated cabinet, a thin continuous film congeals on the surface of the cooler fruit or vegetable, in about 30 seconds of treatment, having a desirable lustrous finish which usually requires no additional brushing or buffing outside of the heated cabinet or applicator.

It is therefore, a purpose of this invention to teach a method of obtaining a high luster on the surface of fruits and vegetables in their preparation for marketing while at the same time attaining excellent control of dehydration.

It is another object of the invention to teach methods whereby the principles of this invention may be applied to the known systems or practices now employed in waxing and polishing citrus fruits or vegetables.

It is a further object of this invention to provide in detail formulae and technique for making use of the principles of the invention where a medium, for control of shrinkage and dehydration of fruits and vegetables, is applied in a molten state in a heated chamber and where the objects to be coated are being passed over revolving brushes.

In its simplest form the invention makes use of the principles of light reflection by crystalline material dispersed in fine solid particles into a film of translucent wax and having a relatively higher refractive index or reflecting surface than the continuous translucent film. The crystalline substance may be of the meroclinic type having lines of cleavage; i. e., a type of plate crystal. As will later be described other types of dispersed particles may be used with good result. However, where application is made of the protective film by brushing the molten material on the cooler surface of the object, being treated, the plate crystals apparently flatten themselves within the congealing wax medium parallel with the treated surface, thus resulting in a light reflecting lustrous film.

The medium or continuous phase should be chosen for its qualities for controlling shrinkage in fruits or vegetables being treated—i. e., inhibiting the rate of water vapor diffusion from the product—and also for its relative transparency, non-toxicity and for its inert character so as not to injure the fruit or the skin or peel thereof. One of the best known materials having these qualities is paraffin wax; however, spermaceti or other animal or vegetable compositions similar to spermaceti and waxy in nature may be used as the continuous film as these optional materials retard the rate of vapor diffusion, when applied to the natural peel or rind of fruits and vegetables, and are relatively transparent in thin film applications. It is considered within the skill of one versed in the art of preparing fruits and vegetables for market to adapt the principles of this invention to that type of wax or other shrinkage control medium, which is being used or by its nature is adaptable for use on the peel or rind of fruits or vegetables upon which treatment is contemplated.

The disperse phase, particles or crystals having higher indices of refraction than the supporting medium, should be relatively immiscible with the continuous phase, but not necessarily entirely so. For instance, dispersion of the particles to the extent of being colloidal is highly satisfactory. Another satisfactory state is that of complete solubility, when the temperature of the mixture is elevated, with a separation into extremely fine crystals or particles occurring when the temperature is reduced or upon congealing on the surface of the fruit. This latter condition results when about 1% of the calcium salt of arabic acid in paraffin wax is heated to about 300° F. and then slowly cooled.

For convenience and simplicity of manufacture and for obtaining best results, both as to shrinkage control and brilliancy of luster the preferred procedure of practicing the invention is as follows:

Example 1

A very fine dispersion of crystalline particles in paraffin wax is obtained by reacting at an elevated temperature, about 250° F., at least some of the constituents of carnauba wax with calcium hydroxide in a mixture of paraffin and carnauba waxes and subsequently cooling to produce crystals of the calcium compound thus formed. The elevated temperature may be as low as the melting point of the mixture up to temperatures ranging around 500° F. to 600° F., but should be kept below the temperature at which the crystals decompose or lose the water of crystallization. The higher the temperature, however, the finer the crystal formation but satisfactory results are obtained with a convenient temperature of 250° F. The preferred formula of proportions of the above ingredients is as follows:

| | Pounds |
|---|---|
| Refined carnauba wax | 5 |
| Paraffin wax (M. P. 135–138° F.) | 94¾ |
| Calcium hydroxide | ¼ | but these proportions vary within wide limits. The carnauba wax is soluble in the paraffin although the reaction products between the calcium hydroxide and the fatty acids of the esters in the carnauba are only sparingly soluble and form, on cooling, minute crystals of a higher refractive index than the surrounding paraffin wax. The particles are dispersed to the colloidal state and a thin film of this material congealed on the outer peel of a perishable edible object, being treated, such as an orange, reduces the normal shrinkage by 60% to 80% and imparts a brilliant luster which needs only a slight smoothing of the outer crystals to make the luster exceedingly stable or permanent. This smoothing may be accomplished by the brushes in the heated cabinet and over which the fruit passes.

Example 2

A second procedure may employ the following ingredients in approximately the following proportions:

| | Pounds |
|---|---|
| Ethyl cellulose | 2 |
| Spermaceti | 10 |
| Paraffin wax | 88 |

The ethyl cellulose is relatively soluble in the spermaceti component and insoluble in the paraffin. The ethyl cellulose is dissolved in the spermaceti at about 250° F. and to this solution the paraffin wax is slowly added while mixing. The temperature of this may be as low as the melting point of the mixture up to temperatures ranging around 500° F. to 600° F. or the temperature of decomposition of the mixture. As the mixture cools fine particles of ethyl cellulose separate and, although they do not form true crystals but are flaky and crystalline in character, they have a high refractive index and serve well as a light reflecting medium when applied to fruits or vegetables in a thin congealed film. The proportions of the above ingredients may be varied within wide limits.

Example 3

A third procedure may employ the following ingredients in approximately the following proportions:

| | Pounds |
|---|---|
| Finely ground mica (200 mesh or smaller recommended) | 5 |
| Paraffin wax | 95 |

The mica and molten wax are mixed together in any convenient manner.

The inert mica is insoluble in the paraffin but is readily wet by the wax and requires only slight agitation to keep it suitably suspended. When the treated fruit or vegetable emerges from the heated cabinet in which the wax coating has been applied, the mica plates, evenly distributed, serve as little mirrors to reflect light and are stably held in place by the congealed paraffin. It is, of course, understood that the above ingredients may be varied within wide limits.

Example 4

Another formula may be followed which is a variation of Example 3 just given. This fourth formula may include having the object, to be treated, first brushed in the presence of atomized molten paraffin wax and then, before the wax has thoroughly congealed, dusting the powdered mica onto the wax and the film thus formed.

It will be understood that the examples given above are in no wise limiting. One skilled in the art will readily see that modifications and variations can be made therein to suit any particular final result desired as to the finish or coating or to suit convenience of compounding and applying the coating or the processing of any particular kind of perishable fruits and vegetables, all within very wide limits.

Thus, in place of the paraffin wax carrier or medium, I find that I may employ as substitutes therefor, the following materials—spermaceti or other animal or vegetable waxes; and, for the carnauba wax, I may employ candelilla wax, montan wax, beeswax, spermaceti or similar waxes. It will be noted that I may employ spermaceti in place of either the paraffin wax or the carnauba wax; for instance, In Example 1 spermaceti may be substituted for the paraffin wax alone or may be substituted for both the paraffin wax or the carnauba wax. In the former case it will be understood, of course, that unlike paraffin wax, the spermaceti is partially reacted upon by the calcium hydroxide forming crystalline products which act as reflectors in addition to those formed by the like reaction of the calcium hydroxide on the carnauba wax. Whereas, if the spermaceti is substituted for the carnauba wax alone in Example 1, the crystalline reflectors formed by the action on the calcium hydroxide results from the action of the latter on the spermaceti alone with the paraffin wax being unreacted upon by the calcium hydroxide. The substitutes for the calcium hydroxide in Example 1 may be sodium hydroxide, magnesium hydroxide, potassium hydroxide, triethanolamine, diethanolamine, monoethanolamine, ammonia and other bases of similar strength.

In Example 2 also the spermaceti may be substituted by carnauba wax and in this example the ethyl cellulose acts as the reflector by itself after cooling the solution, no other reflecting agent being necessary in this particular example.

With respect to Example 3 the finely ground mica is the reflecting agent, the paraffin wax being the medium or carrier which may be substituted with either spermaceti or by the other substitutes for the paraffin wax previously mentioned. For the mica mentioned in Examples 3 and 4 I may use talc, pulverized shellac, water soluble gums and their metallic salts, suitable resins and resin salts, and the like.

From the above it will be obvious that the coating material set forth herein, particularly in the four formulae given, is non-aqueous within which may be dispersed crystalline material which may or may not be water soluble. This is to be distinguished from aqueous compositions or compounds, particularly emulsions, in the application of which the continuous coating is formed by the water soluble ingredients and the emulsifying agent and in which the wax is dispersed. From this difference I derive the benefit of making full use of the preservative qualities of the wax in a continuous film or coating with the light-reflecting crystals dispersed therein; whereas in an aqueous or emulsion application the preservative qualities of the wax are diminished, as the wax is in the dispersed or discontinuous phase of the coating. Any polish derived from the emulsified waxes must be from the use of an extremely hard wax irrespective of any other material which may be added to assist in producing a polish.

In applying the protection material, as set forth in the above examples, to the fruit or edible perishable materials to be treated, I propose to employ the so-called Brogdex applicator which consists of a heated cabinet having revolving brushes at its bottom and which forms a bed over which the fruit to be treated passes during its ingress and egress from the cabinet.

The coating material of Examples 1, 2 and 3 may be atomized under pressure into the cabinet from above the brushes. The coating material should be kept molten or sufficiently fluid to be applied in the manner just stated above. A temperature of 170° F. is ordinarily preferred and while higher temperatures are not critical, the temperature should not be so high as to injure the fruit and it is found that temperatures above about 180° F. are somewhat objectionable in many instances. The lower limit of the range of temperatures for keeping the wax in a fluid state may be as low as 120° F. to 150° F., depending upon the congealing points which for different waxes or mixtures may range between the last mentioned temperatures.

In applying Formula 4 as stated above, the mica may be dusted on the brushes or picked up from a pan suspended beneath the brushes in the heated cabinet. Another way of application of the mica is to first apply the liquid or molten wax carrier to the fruit in any of the ways mentioned above and afterward sprinkling or dusting the ground mica over the coated fruit or object being treated even after the coating congeals, a sufficient amount of the mica adhering to the coating on the fruit to bring out the polish.

In present practice there are a number of buffing or polishing brushes aranged outside of the heated cabinet mentioned above on the exit side of the heated cabinet. The present invention eliminates the necessity of these brushes. Therefore, the movement and the vigorous brushing usually employed on the exit side of the heated cabinet mentioned above may be entirely limited.

What I claim is:

1. A method of imparting a lustrous finish to the skin or rind of fruits or vegetables, comprising covering the fruit with a non-aqueous continuous substantially water-impervious coating comprising a non-toxic substantially translucent carrier selected from the group consisting of paraffin wax and spermaceti and constituting the continuous phase having dispersed therein a finely divided solid light-reflecting agent, whereby a lustrous appearance is imparted to the fruit due to the reflection of the light by said reflecting agent and whereby also dehydration of the fruit is prevented by the water impervious film of the carrier.

2. A method of imparting a lustrous finish to the skin or rind of fruits or vegetables, comprising covering the fruit with a non-aqueous continuous substantially water-impervious coating selected from the group consisting of paraffin wax and spermaceti and constituting the continuous phase having finely divided mica dispersed therein, whereby a lustrous appearance is imparted to the fruit due to the reflection of the light by the finely divided mica and whereby dehydration of the fruit is prevented by the water-impervious film of paraffin.

3. A method of imparting a lustrous finish to the skin or rind of fruits or vegetables, comprising dissolving a saponifiable ester wax in a molten paraffin wax, reacting the saponifiable ester wax at least in part with a base selected from the group consisting of alkali metal hydroxides and alkali earth metal hydroxides to form a light-reflecting solid salt, corresponding to the base and the ester, in a state of fine dispersion throughout the paraffin, which constitutes the continuous phase, and then covering the surface of the fruit or vegetables to be treated with a film of the non-aqueous fluid mixture thus formed and congealing the fluid film upon the surface of the fruit or vegetables to form a lustrous light-reflecting covering over the said surface.

4. The method of imparting a lustrous finish to the skin or rind of fruits or vegetables in accordance with claim 1 in which the finely divided solid light-reflecting agent is an oil-insoluble salt of a fatty acid.

5. The method of imparting a lustrous finish to the skin or rind of fruits or vegetables in accordance with claim 1 in which the finely divided solid light-reflecting agent is an oil-insoluble solid having a micaceous fracture.

6. The method of imparting a lustrous finish to the skin or rind of fruits or vegetables in accordance with claim 1 in which the finely divided solid light-reflecting agent is ethyl cellulose.

7. The method of imparting a lustrous finish to the skin or rind of fruits or vegetables in accordance with claim 1 in which the finely divided solid light-reflecting agent is an oil-insoluble salt of a fatty acid and the carrier is a non-volatile non-aqueous paraffin wax.

8. The method of imparting a lustrous finish to the skin or rind of fruits or vegetables in accordance with claim 1 in which the finely divided solid light-reflecting agent is an oil-insoluble solid having a light-refracting index substantially greater than that of the carrier.

9. A polishing composition adapted for forming a protective film over the surfaces of the skin or peel of fruits and vegetables to prevent dehydration thereof and to impart a desirable lustrous finish thereto comprising a non-toxic, non-aqueous substantially translucent and substantially inert water-impervious oily-type carrier selected from the group consisting of paraffin wax and spermaceti and constituting the continuous phase having dispersed therein finely divided, solid, light-reflecting oil-insoluble substance in the disperse or discontinuous phase.

10. A polishing composition according to claim 9 in which the carrier is a non-volatile non-aqueous paraffin wax.

11. A polishing composition according to claim 9 in which the carrier is spermaceti.

12. A polishing composition according to claim 9 in which the light reflecting disperse phase is an oil-insoluble salt of a fatty acid.

13. A polishing composition according to claim 9 in which the light-reflecting disperse phase is an oil-insoluble solid having a light-refracting index substantially greater than that of the carrier.

14. The method of imparting a lustrous finish to the skin and rind of fruits or vegetables, comprising dissolving a saponifiable ester wax in a molten saturated paraffin hydrocarbon wax, reacting at least a portion of the saponifiable ester wax with an aqueous solution of calcium hydroxide at a temperature of about 250° F. until a substantial portion, at least, of the ester wax is converted into the calcium salts of the fatty acids contained in chemically combined form in the said ester wax, to form a dispersion of finely divided particles of the calcium salts in the hydrocarbon wax which constitutes a continuous phase and then covering the surface of the fruit or vegetables with a film of the fluid mixture thus formed and congealing the fluid film upon the surface of the fruit or vegetables to form a plastic semi-solid film over the said surface containing the said salts in a finely divided state dispersed throughout the paraffin wax, whereby a desirable lustrous finish is imparted to the skin or rind of the fruit or vegetables and the fruit or vegetables are protected against dehydration and shrinkage under normal conditions of storage, handling and use.

15. A polishing composition according to claim 9 in which the light-reflecting disperse phase is an oil-insoluble solid having a micaceous fracture.

16. A polishing composition according to claim 9 in which the light reflecting disperse phase is an oil-insoluble salt of a fatty acid and the carrier is a paraffin wax.

17. A polishing composition according to claim 9 in which the light reflecting disperse phase is an oil-insoluble salt of a fatty acid and the carrier is spermaceti.

JAMES F. HUSSEY.